United States Patent [19]

Nixon

[11] 4,306,178

[45] Dec. 15, 1981

[54] DISPLAY ARRANGEMENTS

[75] Inventor: Ralph D. Nixon, Braintree, England

[73] Assignee: English Electric Valve Company, Chelmsford, England

[21] Appl. No.: 81,387

[22] Filed: Oct. 3, 1979

[30] Foreign Application Priority Data

Oct. 4, 1978 [GB] United Kingdom ............... 39285/78

[51] Int. Cl.[3] ........................ G06K 15/20; H01J 31/16

[52] U.S. Cl. ...................................... 315/365; 313/410

[58] Field of Search ................ 315/365; 313/395, 396, 313/410, 411

[56] References Cited

U.S. PATENT DOCUMENTS 3,651,361 3/1972 Tanaka et al. ...................... 313/410

4,167,690 9/1979 Gange ................................ 315/366

FOREIGN PATENT DOCUMENTS 1187293 4/1970 United Kingdom .

1290387 9/1972 United Kingdom .

1420137 2/1973 United Kingdom .

*Primary Examiner*—Theodore M. Blum

*Attorney, Agent, or Firm*—Spencer & Kaye

[57] ABSTRACT

A display arrangement consists of a cathode ray tube in which electrons from a flood gun pass through a segmented mesh electrode, different portions of which can be selectively switched to enable the electrons to reach only selected portions of a fluorescent screen. As very low switching voltages are applied to the mesh electrode to control the passage of electrons from the flood gun, the cathode is heated to the temperature at which electrons are emitted by the application of relatively short high current pulses. Electrons are allowed to pass through the mesh electrode only during the intervals between these pulses.

2 Claims, 4 Drawing Figures

DISPLAY ARRANGEMENTS

This invention relates to display arrangements which are capable of presenting relatively large, bright and readily alterable displays with a moderate power consumption, and more particularly to display arrangements utilising a cathode ray tube. In order to alter a picture or character on the display surface of the cathode ray tube, an electrode structure can be provided to which appropriate switching potentials are applied so as to selectively prevent electrons reaching the fluorescent screen of the cathode ray tube. With certain kinds of display arrangement the switching potentials required have very low values and the voltage drop across a cathode which is heated directly by passing a current through it can be significant relative to the value of the switching potentials. This can make it difficult to obtain the correct switching action over the whole of the display surface, and the present invention seeks to reduce this difficulty.

According to the invention a display arrangement includes a cathode ray tube having an electron flood gun containing a directly heated cathode which is arranged to irradiate a segmented mesh electrode structure mounted adjacent to a fluorescent screen, different segments of the electrode structure being selectively addressable to control passage of electrons through selected portions of the electrode structure, and means for applying pulses of current periodically to the cathode to heat it and for preventing electrons reaching the fluorescent screen, whilst the current pulses are applied to the cathode.

Preferably the polarity of the potentials of the pulses applied to the cathode is such as to bias the cathode sufficiently positive so as to prevent electrons reaching the fluorescent screen whilst the pulses are applied.

Preferably again a field mesh electrode is positioned between the electron flood gun and the segmented mesh electrode structure so as to enable a space charge of electrons to be formed in its vicinity.

In operation relatively low velocity electrons are drawn through the field mesh and accelerated towards the fluorescent screen to which a very high positive potential is applied.

Figure 1:
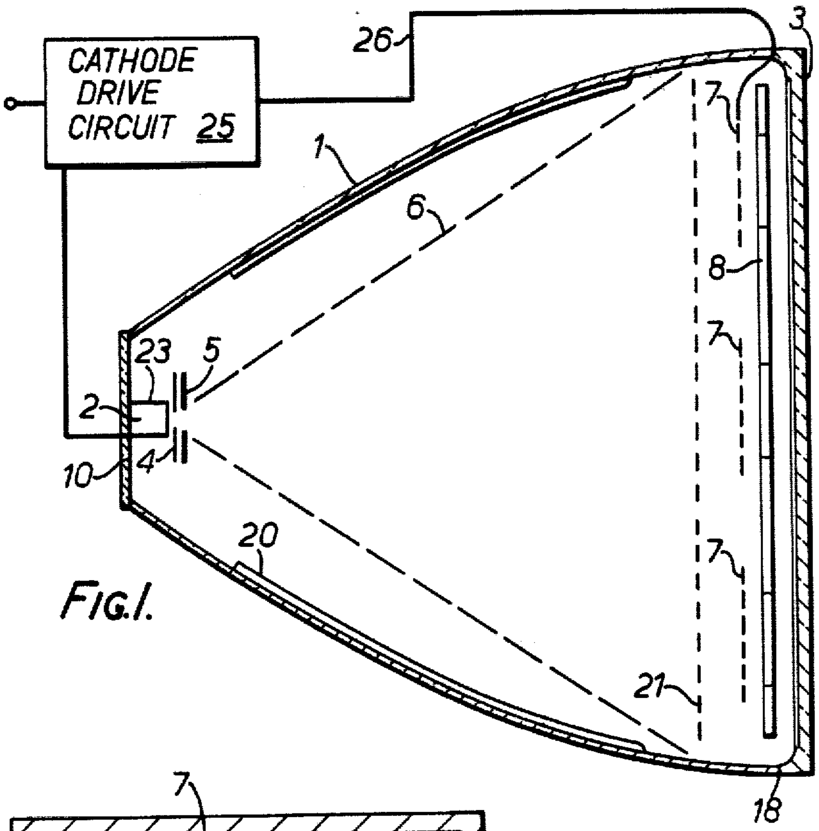
Figure 2:
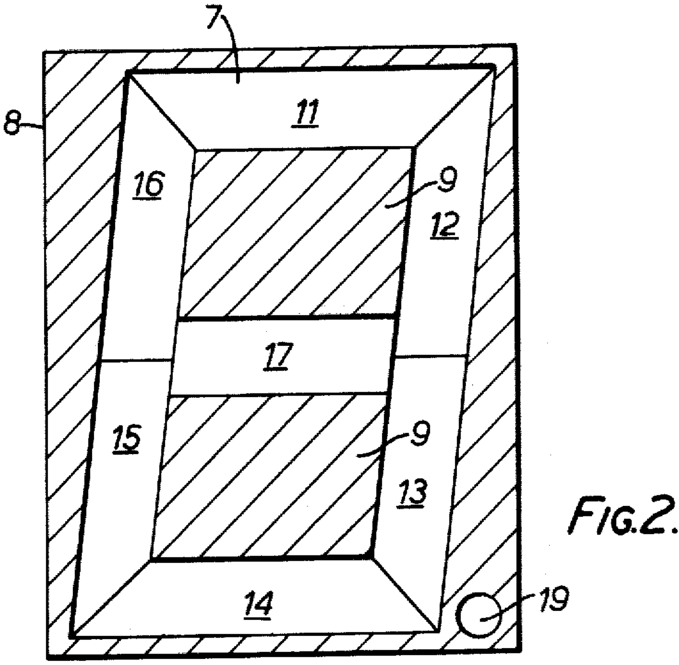
Figure 3:
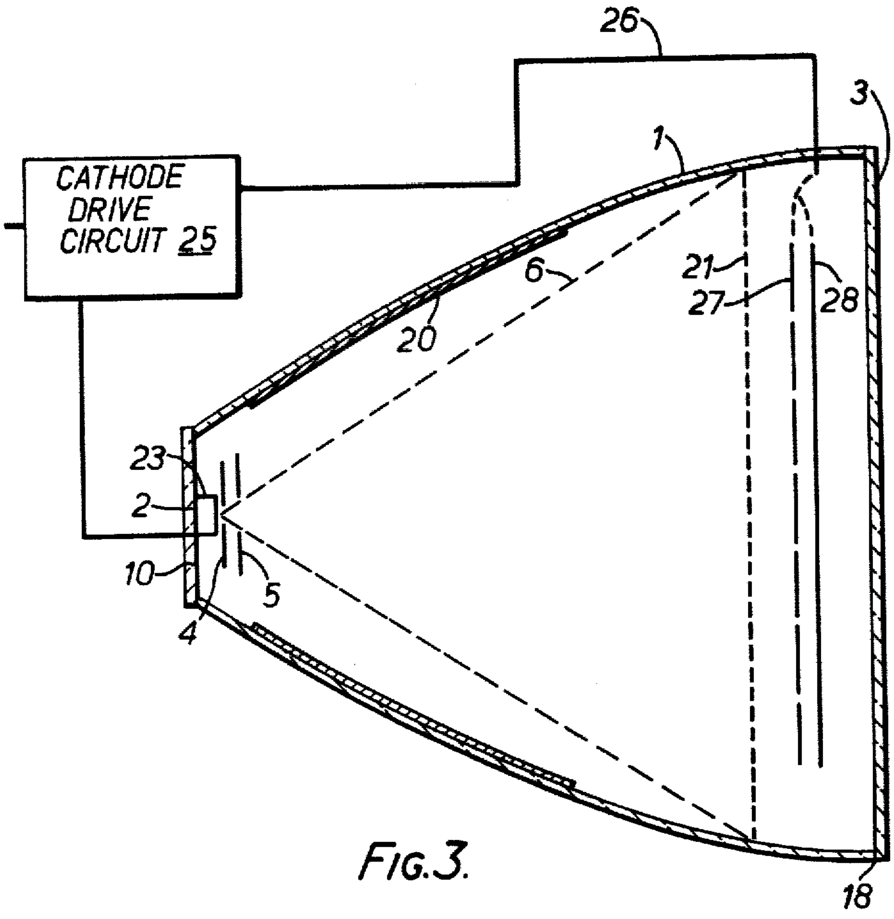
Figure 4:
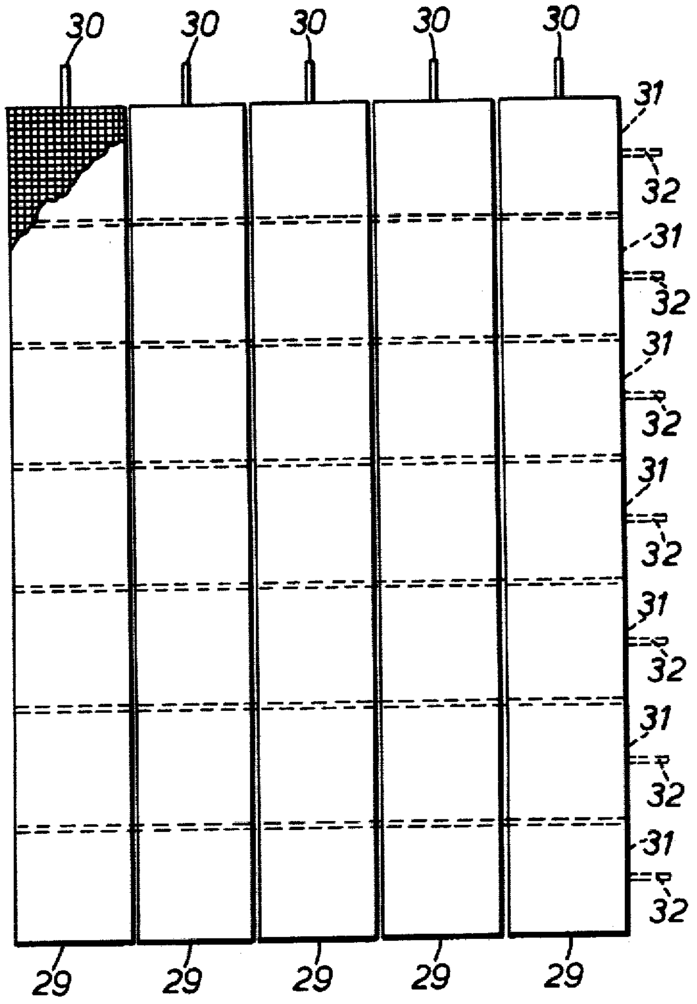

The present invention is further described by way of example with reference to the accompanying drawings in which, FIG. 1 shows a section view of a display arrangement in accordance with the present invention, FIG. 2 shows a portion thereof in greater detail, FIG. 3 shows a modified display arrangement and FIG. 4 shows a portion thereof in greater detail.

Referring to FIGS. 1 and 2, the display arrangement consists of a cathode ray tube 1 having a flood gun 2 at one end, and a fluorescent screen 3 at the other end. The flood gun 2 produces a wide, solid cone of electrons when it is energised, and not the narrow pencil-like beam which is so often associated with cathode ray tubes. Flood guns, however, are well known and so will not be described in detail here—they are used in conventional storage tubes for example. The flood gun 2 consists of a directly heated cathode 23, grid 4 and anode 5 and produces a wide beam 6 which illuminates the whole of a segmented mesh electrode 7 which is positioned close to and in front of a metal plate 8.

The mesh electrode 7 and the metal plate 8 are shown in greater detail in FIG. 2—they are drawn as seen from the direction of the fluorescent screen 3 and it can be seen that the plate 8 is provided with an aperture corresponding to a stylised figure of eight, the two island portions 9 being supported by narrow necks not separately shown.

Through the apertures, the seven segments 11 to 17 of the segmented mesh electrode 7 can be seen. The mesh is a fine one (typically 500/inch) and the seven segments are electrically insulated from each other, but are provided with separate electrical connections so that each segment is individually addressable. The individual leads may be taken out through the base 10 of the cathode ray tube 1 along with the leads for the electron gun 2, or they can be taken off through a sealed joint 18 between the body of the tube 1 and the screen 3. The plate 8 is electrically insulated from the mesh electrode 7 and is held at cathode potential. A circular aperture 19 is provided in the bottom right corner of plate 8 for display applications requiring a decimal point. In such a case a small mesh electrode is positioned behind it in the plane of the mesh electrode 7.

As is usual with cathode ray tubes a cone shaped electrode 20 is provided, and in practice could conveniently consist of a graphite coating on the inside wall of the tube. In order to improve collimation of the electron beam a field grid 21 is provided.

In operation the following potentials are applied to the display device. The cathode 23 is at 0 volts, the anode 5 is at +50 volts to +100 volts, electrode 20 is at about +10 volts, the field grid 21 is at about +10 volts and the screen 3 is at about +5k volts. Those segments of the mesh electrode 7 required to pass electrons are held at about cathode potential and those required to prevent passage of electrons are at −5 volts. Those portions of the mesh electrode 7 passing electrons produce bright areas on the fluorescent screen 3, whilst the remainder of the display area is dark.

With a directly heated cathode 23, which consists of an electron emissive filament through which current is passed to heat it, the potential drop along its length can be significant relative to the range of switching potentials of about 5 volts applied to the mesh electrode 7. It is the potential on the different segments of the mesh electrode 7 relative to cathode potential which determines which areas of the screen 3 are bright and which are dark. Consequently the cathode 23 is not operated continuously but is instead heated by means of current pulses applied to it from a cathode drive circuit 25.

The cathode drive circuit 25 consists of a clock source and amplifier, which applies voltage pulses of relatively short duration across a resistor and the electron emissive filament which constitutes the directly heated cathode 23 which is in series with the resistor. The end of the resistor remote from the cathode is earthed, and a positive pulse is applied to the other end of the cathode, so that during the period when the heating pulse occurs, a fraction of it appears across the resistor and the whole of the cathode is thus raised to a potential which is sufficiently positive so as to prevent electrons reaching the field grid 21.

The cathode 23 may consist of a number of individual filaments connected in parallel. For example a pulse of 30 volts, 1.2 amps is applied to the cathode and resistor for 10% of the time. This gives a d.c. rating of $30/\sqrt{10}$ volts at $1.2/\sqrt{10}$ amps, i.e. 9.5 volts at 0.4 amps approximately. A resistor value of 5Ω in series with the cathode produces an upward pulse on the cathode of about 6 volts, which is sufficient to cut off the electron emission current.

Alternative cathode bias configurations are possible. If desired the power loss in the resistor can be reduced by impedance matching with a small transformer, one winding of which is connected in series between the cathode and the resistor and the other winding of which is connected in parallel across the resistor.

The frequency at which the pulses are applied must be high enough to prevent the cathode cooling significantly between pulses. The use of a pulsed current leaves the cathode at zero potential for 90% of the time and it is only during this time that electrons from the cathode 23 are allowed to reach the screen 3. Instead of, or in addition to the provision of the additional series resistor electrons may be prevented from reaching the screen, whilst the current pulse is applied to the cathode, by applying a suitable potential to the mesh electrode 7 as a whole over line 26 or to the mesh electrode 21.

An alternative display device is illustrated in FIG. 3 and it differs from the display device already described with reference to FIG. 1 by the nature of the segmented mesh electrode structure which in this case consists of two segmented mesh electrodes 27 and 28. In view of the similarity between two display devices the same reference numerals are used for common parts and it is not thought necessary to describe the basic structure of the device again. The actual nature of the two segmented mesh electrodes 27 and 28 is illustrated in greater detail in FIG. 4. They are drawn as seen from the direction of the fluorescent screen 3 and it can be seen that both consists of segments in the form of parallel stripes. The segmented mesh electrode 28 consists of five vertical segments 29, termed columns, which are electrically insulated from each other, and each segment is provided with a separate electrical connection point 30. The segmented mesh electrode 27 consists of seven horizontal segments 31 termed rows (which are shown in broken lines for the sake of clarity) which also are electrically insulated from each other and from the segments 29 of the other electrode 28. Each segment 31 is provided with an electrical connection point 32.

Each segment consists of an open mesh made of an electrically conductive portion, which may, for example, be formed by a fine matrix of crossing wires. A portion of this mesh-like structure is illustrated at the top left corner of FIG. 4. The open mesh permits electrons to pass readily through the interstices with little physical interruption, and the passage of electrons is controlled by the potential present on a particular segment. The mesh is typically about 500 lines/inch. It is only those electrons which pass through both segmented mesh electrodes 27 and 28 that produce a bright visible image when they strike the fluorescent screen 3. It is not necessary for both segmented mesh electrodes to be made from mesh of the same pitch, and it may be desirable for the segmented electrode 27 to be of coarser pitch or higher transmission ratio to obtain the brightest display.

Each segment is provided with a separate electrical lead passing through the envelope of the tube 1 so that each segment is separately addressable. The leads can be taken out through the base of the tube 1 along with the leads for the electron gun 2, or they can be taken off through a sealed joint between the body of the tube 1 and the screen 3.

The field mesh 21 is positioned closely adjacent to the electrode 27 on the flood gun side of it. It is spaced a millimeter or so from the electrodes 27, and the two mesh electrodes 27 and 28 are spaced apart by about the same amount. Each mesh electrode 27 and 28 is mounted on its own supporting plate. The supporting plates are not illustrated but each consists of an opaque plate having apertures corresponding to the shape of the mesh segments to be supported. The supporting plates in addition to providing mechanical support for the mesh segments also prevents electrons passing between the different adjacent segments which make up a complete segmented mesh electrode. The segments are conveniently attached to the appropriate supporting plate by means of an electrically insulating adhesive applied around the periphery of the segment. It is, of course, necessary to maintain electrical isolation between the various segments so that each can be addressed individually.

The potentials applied to the cathode 23, the screen 3, the electrode 20 and the field mesh are as for the previously described display device. When the connections 30 and 32 to the rows 29 and columns 31 respectively of the segmented mesh electrodes 27 and 28 are held at cathode potential (i.e. zero volts) or just a few volts negative, the fluorescent screen 3 remains dark as no electrons from the flood gun 2 reach it. If, say, a row 29 is held a few volts positive the screen remains dark as long as the columns 31 remains at cathode potential, but if both a row and column are held a few volts positive with respect to the cathode a bright area appears on the screen 3 corresponding to the cross-over region of the row and the column.

Typical figures, by way of example, are −2 volts on mesh electrode 28 and zero volts on mesh electrode 27 to produce cut-off of the electron beam i.e. a "dark" display, and +3 volts on mesh electrode 28 and +5 volts on mesh electrode 27 to produce a bright region. By sampling the columns rapidly one at a time (e.g. at a few hundred Hertz or more) and pulsing positively the appropriate rows, a pattern of bright regions is produced on the screen 3, and by choosing the correct rows and columns alpha-numeric characters are displayed.

Drive circuits which produce the signals necessary to generate a particular character are now well known and readily available, since such circuits are used to drive certain kinds of light emitting-diode arrays. The actual level of the drive signals required for the rows and columns can be readily found, but are typically as given above. The value is dependent partly on the pitch of the mesh itself, and as previously mentioned the pitch of one segmented mesh electrode may differ from that of the other.

Again the magnitude of the switching potentials applied to electrodes 27 and 28 is significant compared to the voltage which is dropped across the cathode 23. Thus voltage pulses may be applied to the cathode 23 from the cathode drive circuit 25 only whilst electrons are prevented from reaching the screen 23 by the application of appropriate cut off potentials to electrodes 27 and 28. Alternatively potential of the pulses applied to the cathode 23 can be sufficient itself to prevent electrons from reaching the screen 3 if an additional series resistor is connected to the cathode 23 as previously described.

I claim:

1. A display arrangement including a cathode ray tube having an electron flood gun containing a directly heated cathode which is arranged to irradiate a segmented mesh electrode structure mounted adjacent to a fluorescent screen, different segments of the electrode structure being selectively addressable to control passage of electrons through selected portions of the electrode structure, and means for applying pulses of current periodically to the cathode to heat it and for preventing electrons reaching the fluorescent screen, whilst the current pulses are applied to the cathode, the polarity and value of the potential of the pulses applied to the cathode being such as to bias the cathode sufficiently positive so as to prevent electrons reaching the fluorescent screen while the pulses are applied.

2. A display arrangement as claimed in claim 1 and wherein a field mesh electrode is positioned between the electron flood gun and the segmented mesh electrode structure so as to enable a space charge of electrons to be formed in its vicinity.

* * * * *